(12) United States Patent
Ooi et al.

(10) Patent No.: US 7,965,277 B2
(45) Date of Patent: Jun. 21, 2011

(54) OPTICAL NAVIGATION SYSTEM AND METHOD OF CONTROLLING THE LIGHT OUTPUT POWER OF THE SYSTEM

(75) Inventors: Kwang Beng Ooi, Penang (MY); Shan Chong Tan, Penang (MY); John Julius Asuncion, Singapore (SG); Lian Chun Xu, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1194 days.

(21) Appl. No.: 11/615,721

(22) Filed: Dec. 22, 2006

(65) Prior Publication Data

US 2008/0149814 A1    Jun. 26, 2008

(51) Int. Cl.
*G09G 5/00*      (2006.01)
*G06F 3/033*     (2006.01)
*G06M 7/00*      (2006.01)

(52) U.S. Cl. ........ 345/163; 345/156; 345/158; 345/166; 250/221

(58) Field of Classification Search ........... 345/156–172
See application file for complete search history.

(56) References Cited

U.S. PATENT DOCUMENTS

| | | | |
|---|---|---|---|
| 5,486,925 A * | 1/1996 | Sano et al. ..................... 356/616 |
| 7,012,938 B2 * | 3/2006 | Hamajima et al. .............. 372/26 |
| 7,081,612 B1 * | 7/2006 | Lu ................................. 250/221 |
| 2005/0134556 A1 * | 6/2005 | VanWiggeren et al. ...... 345/156 |
| 2006/0255152 A1 * | 11/2006 | Xie et al. ................. 235/472.01 |

* cited by examiner

*Primary Examiner* — Bipin Shalwala
*Assistant Examiner* — Benyam Ketema

(57) ABSTRACT

An optical navigation system and method of controlling the light output power of the system uses an optical feedback system to control the driving signal being applied to a light source of the optical navigation system.

18 Claims, 6 Drawing Sheets

OPTICAL NAVIGATION SYSTEM AND METHOD OF CONTROLLING THE LIGHT OUTPUT POWER OF THE SYSTEM

BACKGROUND OF THE INVENTION

Optical navigation systems, which are commonly found in optical computer mice, have traditionally used light-emitting diodes (LEDs) as light sources. Recently, however, optical navigation systems that use lasers as light sources have been developed. The laser-based optical navigation systems are more sensitive to surface features than the LED-based optical navigation systems. Thus, laser-based optical navigation systems are able to accurately track on more challenging surfaces such as polished surfaces.

Most lasers are capable of causing eye injury, even permanent eye damage, to users who look directly into the laser beam. The severity of the eye injury depends on the power of the laser beam. Thus, laser-based optical navigation systems require a much more stringent eye safety regulation than the LED-based optical navigations systems. IEC 60825-1 standard is applicable to safety of laser products including laser optical mice. In order for a laser optical mouse to be classified as Class-1 product (eye-safe under all operating conditions) under the IEC 60825-1 standard, the maximum optical power output of the laser source of the laser optical mouse must not exceed a prescribed threshold, which is dependent on the wavelength and its mode of operation. As an example, a single mode vertical-cavity surface-emitting laser (VCSEL) with a nominal wavelength of 840 nm must have a peak output power of less than 716 uW in the Continuous Wave (CW) mode to be classified as Class-1 product.

Current laser-based optical navigation systems are open loop systems. Thus, to produce Class-1 laser optical mice, every laser needs to be tested to determine the threshold current, the slope efficiency and the temperature coefficient. Each laser is then matched with a fixed binning resistor in the current regulating circuit. The drive current for each laser is adjusted through sensor digital-to-analog converter (DAC) bits so that the power of the laser is set at a fixed value, e.g., 500 uW.

A concern with these conventional laser-based optical navigation systems is that the calibration process of the lasers is very tedious, time consuming and costly, and may result in low manufacturing productivity. Another concern is that customers will need to control their manufacturing environment, especially temperature, to ensure that the initial calibration parameters are maintained within acceptable ranges.

Thus, there is a need for a laser-based optical navigation system that addresses the above-described concerns.

SUMMARY OF THE INVENTION

An optical navigation system and method of controlling the light output power of the system uses an optical feedback system to control the driving signal being applied to a light source of the optical navigation system. The optical feedback system allows the light output power of the optical navigation system to be maintained within a desired level, such as the maximum light output power level for Class-1 product under the IEC 60825-1 standard. Thus, the optical feedback system eliminates the need to calibrate the light source, which can reduce manufacturing costs and increase manufacturing productivity.

An optical navigation system in accordance with an embodiment of the invention comprises a light source, an image sensor, a current source and an optical feedback system. The light source is configured to emit light in response to a driving signal. The image sensor is positioned to receive some of the light reflected from a target surface to capture frames of image data of the target surface. The current source is connected to the light source to control the driving signal being applied to the light source. The optical feedback system is optically coupled to the light source to receive some of the light emitted from the light source. The optical feedback system is electrically connected to the current source to provide a control signal to the current source to control the driving signal being applied to the light source to control the power of the light emitted from the light source.

A method of controlling the light output power of an optical navigation system in accordance with an embodiment of the invention comprises emitting light from a light source of the optical navigation system in response to a driving signal, receiving some of the light from the light source that is reflected from a target surface at an image sensor of the optical navigation system to capture frames of image data of the target surface, receiving some of the light from the light source at a photodetector of an optical feedback system of the optical navigation system, generating a control signal in response to the light received at the photodetector of the optical feedback system, and controlling the driving signal being applied to the light source using the control signal to control the power of the light emitted from the light source.

Other aspects and advantages of the present invention will become apparent from the following detailed description, taken in conjunction with the accompanying drawings, illustrated by way of example of the principles of the invention.

DETAILED DESCRIPTION

Figure 1:
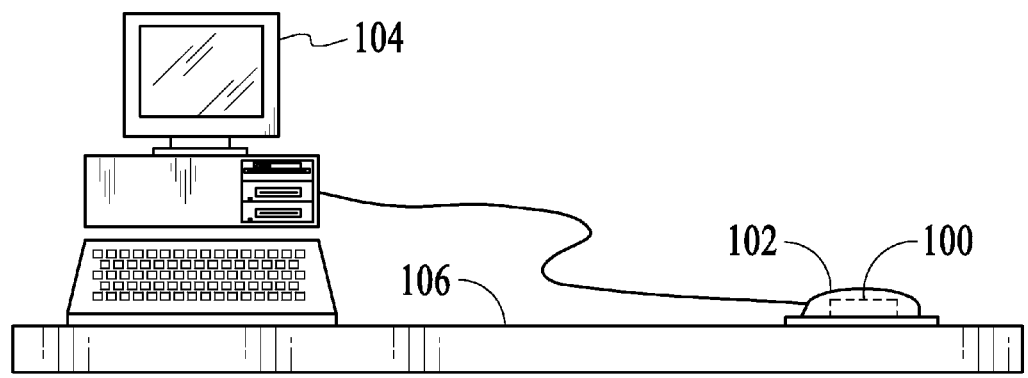
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a target surface 106 by a user to control a cursor displayed on the computer 104. However, in other implementations, the optical navigation system 100 can be used in different products for various tracking applications. As described in detail below, the optical navigation system 100 is configured to continuously monitor and control the light output power of the system using optical feedback. Thus, unlike conventional optical navigation systems, the optical navigation system 100 does not have to be manually calibrated with respect to light output power, which increases manufacturing productivity and lowers manufacturing costs. Furthermore, since the light output power of the optical navigation system 100 is continuously monitored and controlled, the light output power of the system 100 can be more reliably maintained within a desired level than conventional optical navigation systems with an open loop design, which cannot control drift in light output power over time.

Figure 2:
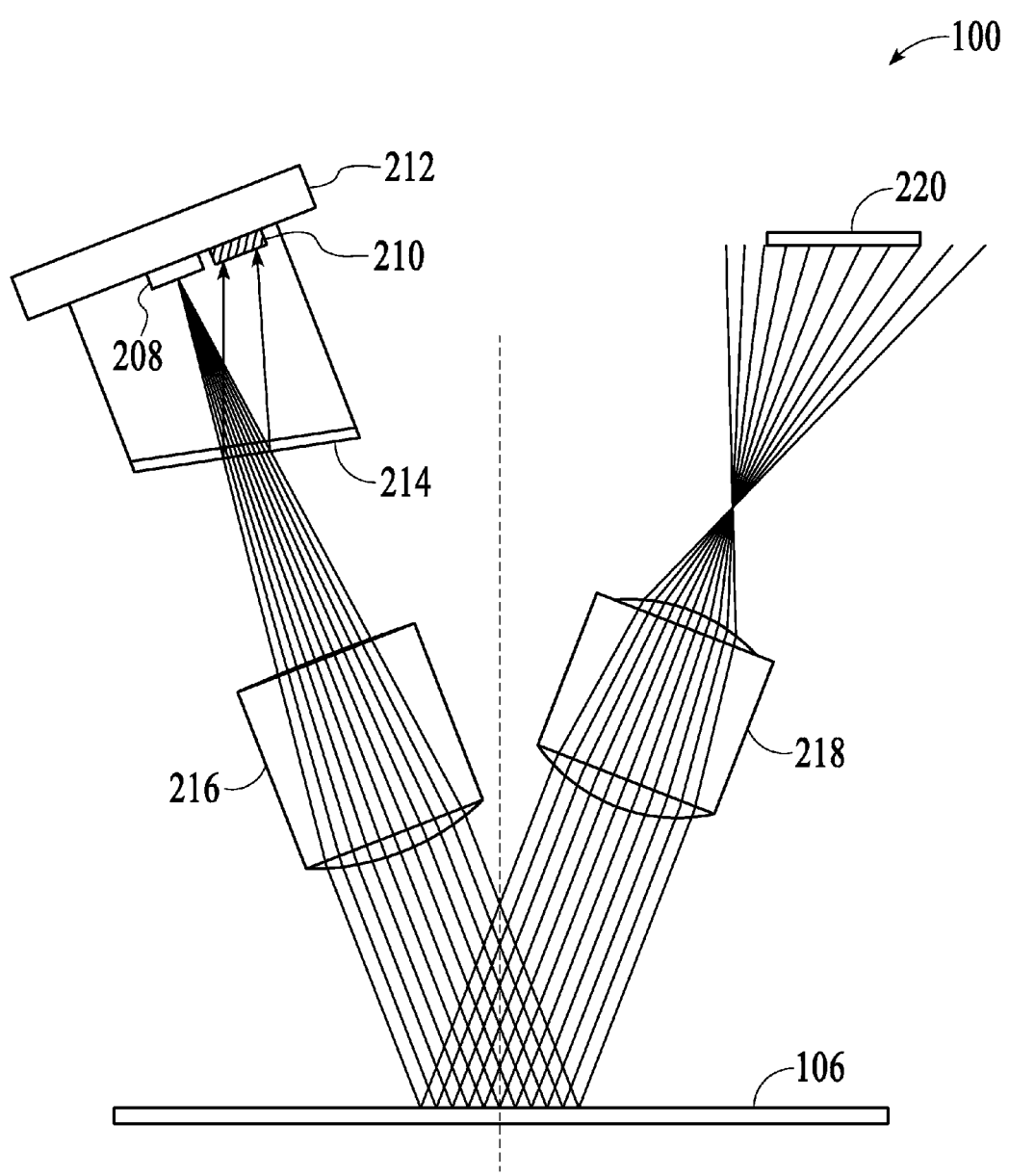
FIG. 2 is a diagram of the optical navigation system in accordance with an embodiment of the invention.

As shown in FIG. 2, the optical navigation system 100 includes a light source 208, a photodetector 210, a printed circuit board (PCB) 212, a beam splitter 214, a collimating lens 216, an imaging lens 218 and an image sensor 220. The light source 208 and the photodetector 210 are physically and electrically connected to the PCB 212. The light source 208 is configured to generate light in response to applied driving signal. The light source 208 can be any type of a light emitting device, such as a light-emitting diode or a laser diode. In this embodiment, the light source 208 is a vertical-cavity surface-emitting laser (VCSEL), which generates coherent laser beam of light. The photodetector 210 is configured to generate an electrical signal in response to received light. As described in more detail below, the light received by the photodetector 210 is a portion of the light emitted from the light source 208. Thus, the electrical signal generated by the photodetector 210 is indicative of the light output power of the light source 208. In this embodiment, the photodetector 210 is a Silicon photodiode. However, in other embodiments, the photodetector 210 can be any type of a photodetector.

The PCB 212 of the optical navigation system 100 includes circuitry to electrically support the light source 208 and the photodetector 210. In particular, the PCB 212 includes circuitry to provide the driving signal to the light source 208 so that the light source is activated to emit light. The PCB 212 also includes circuitry to receive and process the electrical signal generated by the photodetector 210 to monitor and adjust, if necessary, the light output power of the light source 208. The circuitry of the PCB 212 is described in more detail below with reference to FIG. 3. In other embodiments, the PCB 212 may be replaced with a package housing, such as TO-Can or plastic housing.

The beam splitter 214 of the optical navigation system 100 is positioned between the light source 208 and the collimating lens 216 to receive the light emitted by the light source 208. The beam splitter 214 is configured to selectively reflect the light from the light source 208 such that most of the received light is transmitted through the beam splitter toward the collimating lens 216 and some of the received light is reflected off the beam splitter. The beam splitter 216 is orientated so that the reflected light is directed to the photodetector 210.

The collimating lens 216 of the optical navigation system 100 is positioned between the beam splitter 214 and the target surface 106 to receive the light from the light source 208 transmitted through the beam splitter 214. The collimating lens 216 is configured to collimate the received light. The collimated light is then transmitted to the target surface 106, where the collimated light is reflected off the target surface.

The imaging lens 218 of the optical navigation system 100 is positioned between the target surface 106 and the image sensor 220 to receive the light reflected from the target surface. The imaging lens 218 is configured to focus the received light onto the image sensor 220.

The image sensor 220 of the optical navigation system 100 is positioned to receive the focused light from the image lens 218. The image sensor 220 includes an array of photosensitive pixel elements (not shown), which generate image signals in response to light incident on the elements. Thus, the image sensor 220 is able to capture frames of image data of the target surface 106 for motion estimation or optical tracking. As an example, the image sensor 220 may be a charged-coupled device (CCD) image sensor or a complementary metal oxide semiconductor (CMOS) image sensor. The number of photosensitive pixel elements included in the image sensor 220 may vary depending on at least the performance requirements of the optical navigation system 100 with respect to optical motion estimation. As an example, the image sensor 220 may include a 30×30 array of active photosensitive pixel elements.

Figure 3:
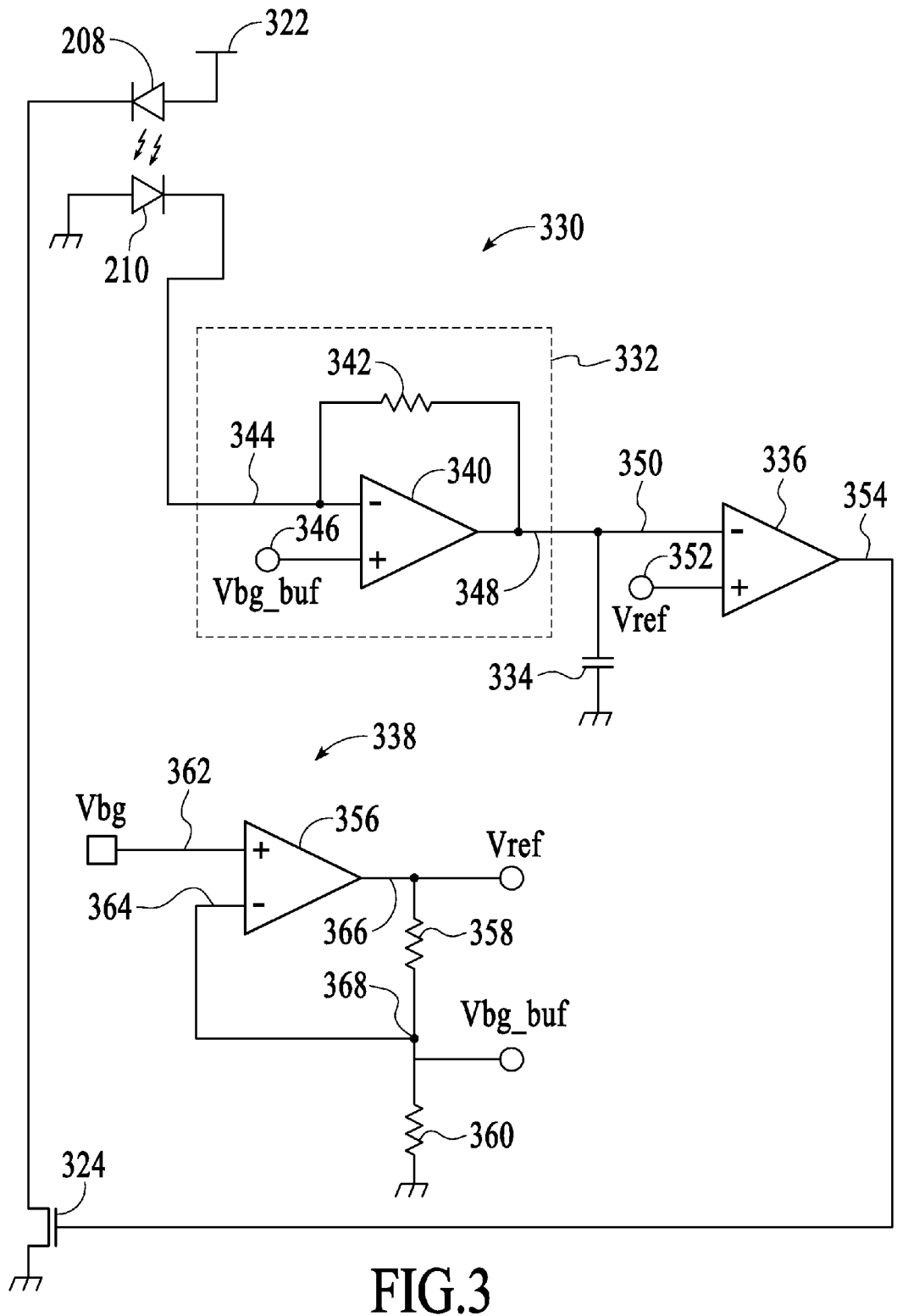
FIG. 3 is a circuit diagram of circuitry of a PCB, a vertical cavity surface-emitting laser (VCSEL) and a photodiode of the optical navigation system in accordance with an embodiment of the invention.

Turning now to FIG. 3, a circuit diagram of the circuitry of the PCB 212, the light source 208 and the photodetector 210 in accordance with an embodiment of the invention is shown. In this embodiment, the light source 208 is a VCSEL and the photodetector 210 is a photodiode. As shown in FIG. 3, the anode of the VCSEL 208 is connected to a supply terminal 322, which provides the driving current to the VCSEL 208. The cathode of the VCSEL 208 is connected to a current source 324 in the form of a metal oxide semiconductor (MOS) transistor, which is connected to electrical ground. Thus, the MOS transistor 324 can control the driving current through the VCSEL 208, and consequently, the power of the light emitted by the VCSEL.

As shown in FIG. 3, the photodiode 210 is part of an optical feedback system 330, which is designed to continuously monitor and control the light output power of the VCSEL 208. The optical feedback system 330 uses the photodiode 210 to optically monitor the light output power of the VCSEL 208. Depending on the light output power of the VCSEL 208, the optical feedback system 330 generates a control signal to increase or decrease the light output power of the VCSEL. The control signal is transmitted to the current source 324 to change the amount of current being applied to the VCSEL 208 to adjust the light output power of the VCSEL to a desired level.

The optical feedback system 330 of the optical navigation system 100 includes the photodiode 210, a transimpedance amplifier 332, a capacitor 334, an error amplifier 336 and a reference circuit 338. The photodiode 210 is positioned near the VCSEL 208 to receive some of the light emitted from the VCSEL, which is reflected off the beam splitter 214, as illustrated in FIG. 2. In response to the received light, the photodiode 210 generates electrical current, which is proportional to the intensity of the light emitted by the VCSEL 208. The anode of the photodiode 210 is connected to electrical ground, while the cathode of the photodiode is connected to the transimpedance amplifier 332.

The transimpedance amplifier 332 of the optical feedback system 330 is configured to convert the electrical current generated by the photodiode 210 into an output voltage signal. Thus, the transimpedance amplifier 332 functions as a current-to-voltage converter. The transimpedance amplifier 332 includes an operational amplifier 340 and a resistor 342. The operational amplifier 340 includes two inputs 344 and 346, and an output 348. The input 344 of the operational amplifier 340 is connected to the cathode of the photodiode 210 to receive the electrical current generated by the photodiode in response to the received light. The other input 346 of the operational amplifier 340 is connected to the reference circuit 338 to receive a reference signal, Vbg_buf. The output 348 of the operational amplifier 340 is connected to the error amplifier 336 to transmit the output voltage signal to the error amplifier. The resistor 342 is connected between the output 348 and the input 344 of the operational amplifier 340 so that the operational amplifier 340 can function as a current-to-voltage converter.

The capacitor 334 of the optical feedback system 330 is connected between the output 348 of the operational amplifier 340 and electrical ground. The capacitor 334 is used to reject or block high-frequency noise of the output voltage signal from the transimpedance amplifier 332 from being transmitted to the error amplifier 336.

The error amplifier 336 of the optical feedback system 330 is configured to compare the output voltage signal from the transimpedance amplifier 332 to a reference voltage signal, Vref. The error amplifier 336 outputs an error signal as a result of the comparison between the output voltage signal from the transimpedance amplifier 332 and the reference voltage signal Vref, which represents the difference between the output voltage signal from the transimpedance amplifier 332 and the reference voltage signal Vref. The error amplifier 336 includes two inputs 350 and 352 and an output 354. The input 350 of the error amplifier 336 is connected to the output 348 of the transimpedance amplifier 332 to receive the output voltage signal. The other input 352 of the error amplifier 336 is connected to the reference circuit 338 to receive the reference voltage signal Vref. The output 354 of the error amplifier 336 is connected to the current source 324, i.e., the MOS transistor 324, to transmit the error signal to control the current source in order to control the amount of driving current being applied to the VCSEL 208. Specifically, the output 354 of the error amplifier 336 is connected to the gate of the MOS transistor 324 to control the MOS transistor. Thus, the error signal from the error amplifier 336 is used as a control signal for the current source 324.

The reference circuit 338 of the optical feedback system 330 includes an operational amplifier 356 and resistors 358 and 360. The operational amplifier 356 includes two inputs 362 and 364, and an output 366. The input 362 of the operational amplifier 356 is connected to receive a reference voltage signal, Vbg, which is the bandgap voltage reference of the optical feedback system 330. The other input 364 of the operational amplifier 356 is connected to a node 368 between the two resistors 358 and 360, which are connected in series between the output 366 of the operational amplifier 356 and electrical ground. The node 368 between the resistors 358 and 360 is connected to the input 346 of the operational amplifier 340 of the transimpedance amplifier 332 to transmit the reference voltage signal Vbg_buf. The output 366 of the operational amplifier 356 is connected to the input 352 of the error amplifier 336 to transmit the reference voltage signal Vref.

Due to the configuration of the reference circuit 338, the reference voltage signal Vbg_buf is equal to the reference voltage signal Vbg. However, the reference voltage signal Vbg_buf is isolated from the reference voltage signal Vbg. In addition, the reference voltage signal Vref is defined as Vref=Vbg_buf[1+(R2/R1)], where R2 and R1 are resistance values of the resistors 358 and 360, respectively. Furthermore, at steady state, (Vref−Vbg_buf)=Iphotodiode*Rtz, where Iphotodiode is the current from the photodiode 210 and Rtz is the resistance value of the resistor 342 of the transimpedance amplifier 332. Thus, the reference voltage signal Vref is able to track any changes to the reference voltage signal Vbg_buf due to non-ideal characteristics of the operational amplifier 356 (i.e., offset).

Figure 4:
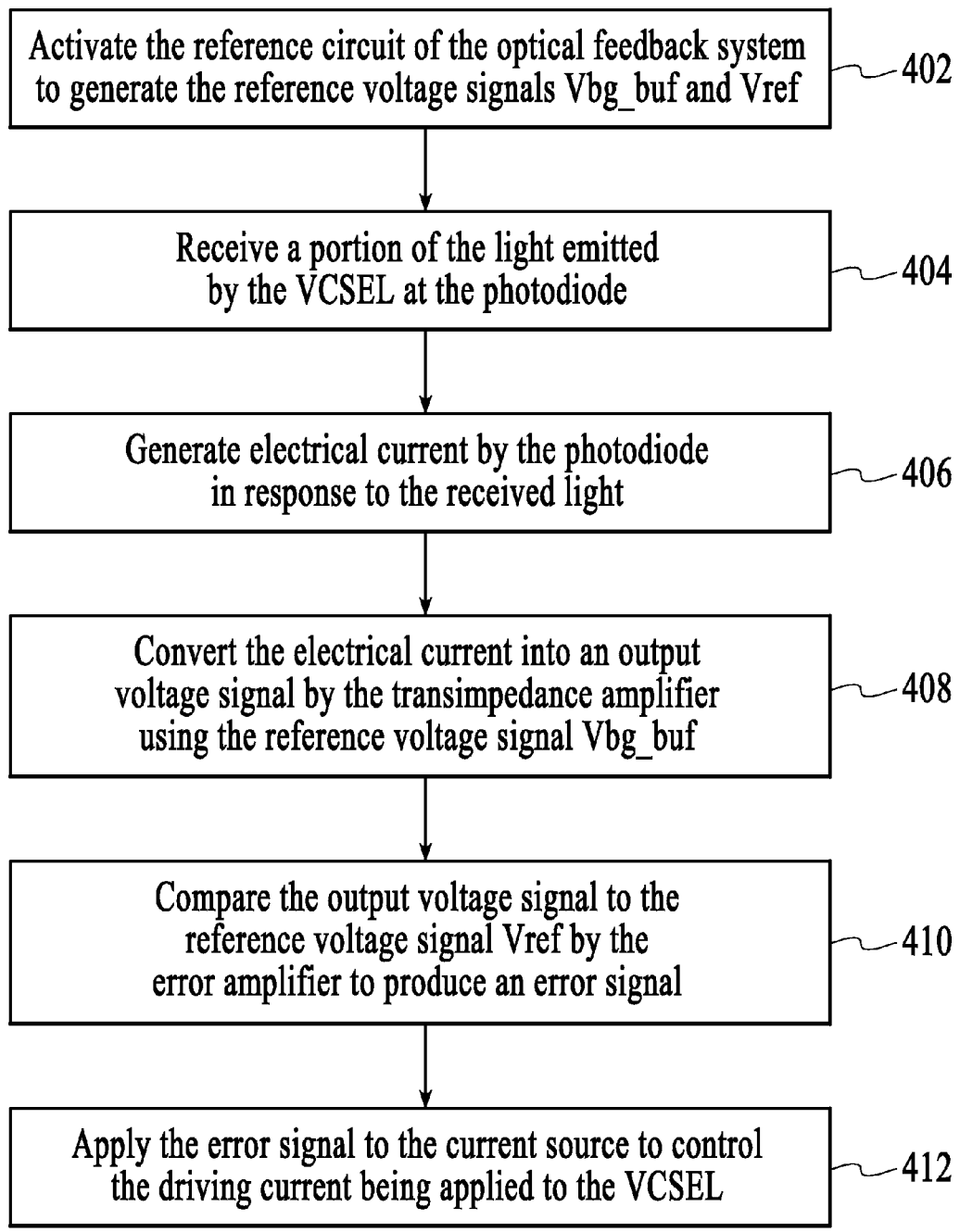
FIG. 4 is a process flow diagram of the operation of an optical feedback system of the optical navigation system in accordance with an embodiment of the invention.

The operation of the optical feedback system 330 is described with reference to a process flow diagram of FIG. 4. Initially, at block 402, the reference circuit 338 of the optical feedback system 330 is activated to generate the reference voltage signals Vbg_buf and Vref, which are applied to the transimpedance amplifier 332 and the error amplifier 336, respectively. Next, at block 404, a portion of the light emitted by the VCSEL 208 is received at the photodiode 210. The received portion of the light at the photodiode 210 is a portion of the emitted light reflected off the beam splitter 214. Next, at block 406, electrical current is generated by the photodiode 210 in response to the received light. Next, at block 408, the electrical current is converted into an output voltage signal by the transimpedance amplifier 332 using the reference voltage signal Vbg_buf. Next, at block 410, the output voltage signal is compared with the reference voltage signal Vref by the error amplifier 336 to produce an error signal. Next, at block 412, the error signal is applied to the current source 324, i.e., the MOS transistor 324, to control the driving current being applied to the VCSEL 208, which controls the intensity of light emitted by the VCSEL, i.e., the light output power of the VCSEL. When the light output power of the VCSEL 208 is below a desired level, the resulting error signal increases the amount of driving current being applied to the VCSEL to increase the light output power of the VCSEL. In contrast, when the light output power of the VCSEL 208 is above the desired level, the resulting error signal decreases the amount of driving current being applied to the VCSEL to decrease the light output power of the VCSEL. In this manner, the light output power of the VCSEL 208 can be maintained within a desired maximum level, such as the maximum light output power level for Class-1 product under the IEC 60825-1 standard.

Figure 5:
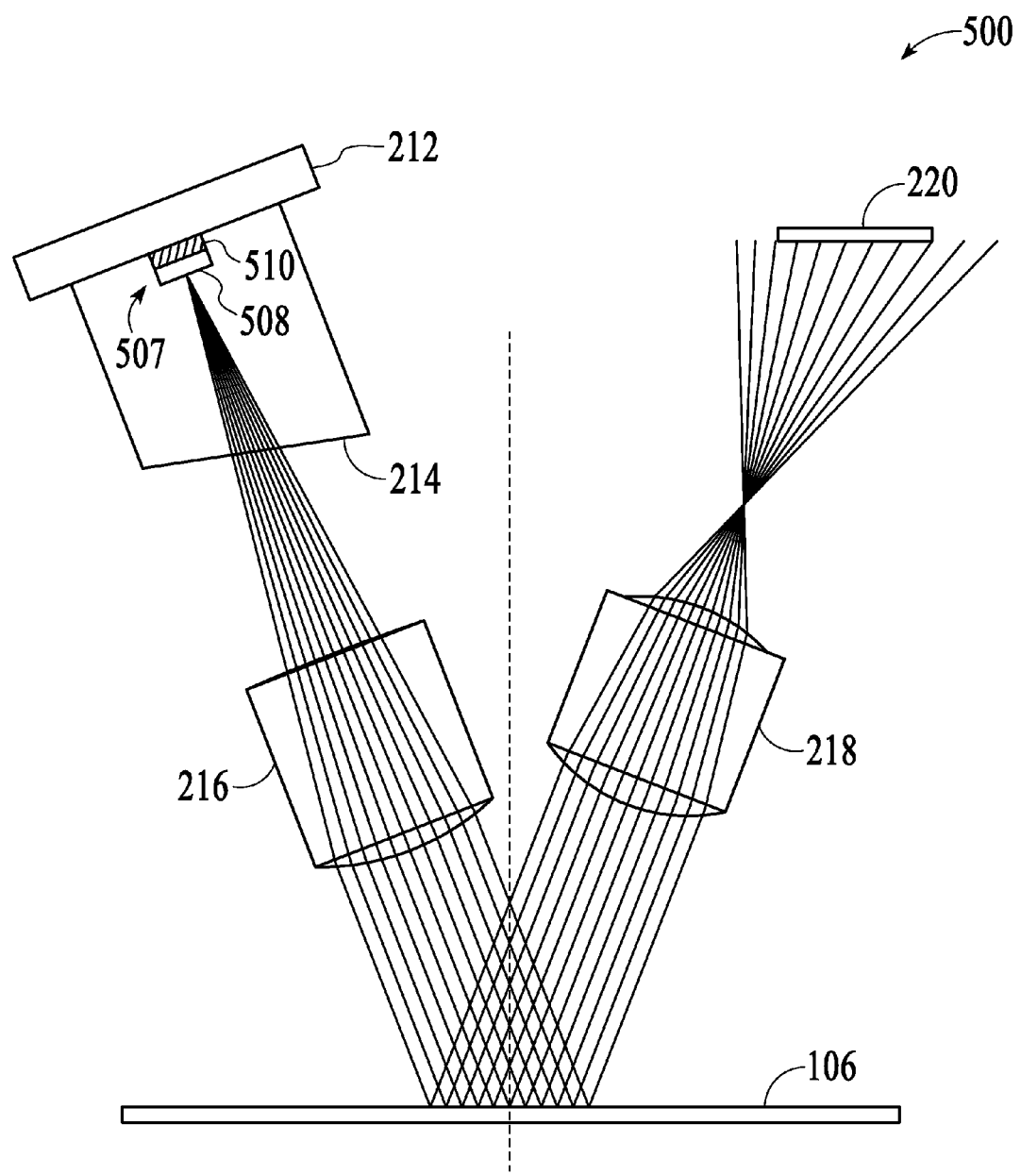
FIG. 5 is a diagram of an optical navigation system in accordance with another embodiment of the invention.

Turning now to FIG. 5, an optical navigation system 500 in accordance with another embodiment of the invention is shown. The optical navigation system 500 is similar to the optical navigation system 100. The optical navigation system 500 includes many of the components found in the optical navigation system 100. Thus, in FIG. 5, the same reference numbers of FIG. 1 are used to identify common elements.

As shown in FIG. 5, the optical navigation system 500 includes the PCB 212 (which can alternatively be a package housing, such as TO-Can or plastic housing), the collimating lens 216, the imaging lens 218 and the image sensor 220. The optical navigation system 500 also includes the circuitry illustrated in FIG. 3. In this embodiment, the optical navigation system 500 includes an integrated VCSEL/photodiode device 507. The integrated VCSEL/photodiode device 507 includes both a VCSEL 508 and a photodiode 510 in a single semiconductor die or chip, which is a single monolithic epitaxial structure. Thus, the VCSEL 508 and the photodiode 510 are parts of a single semiconductor die. In the illustrated embodiment, the integrated VCSEL/photodiode device 507 is configured such that the photodiode 510 is positioned below the VCSEL 508. However, in an alternative embodiment, the photodiode 510 may be positioned over the VCSEL 508. Since the photodiode 510 is positioned above or below the VCSEL 508, at least a portion of the light emitted from the VCSEL 508 is transmitted to the photodiode to monitor the light output power of the VCSEL in the manner described above. Thus, in these embodiments, the beamsplitter 214 is not needed to reflect some of the light emitted from the VCSEL 508 to the photodiode 510. The optical navigation system 500 operates in a manner similar to the optical navigation system 100 to monitor and control the light output power of the VCSEL 508.

Figure 6:
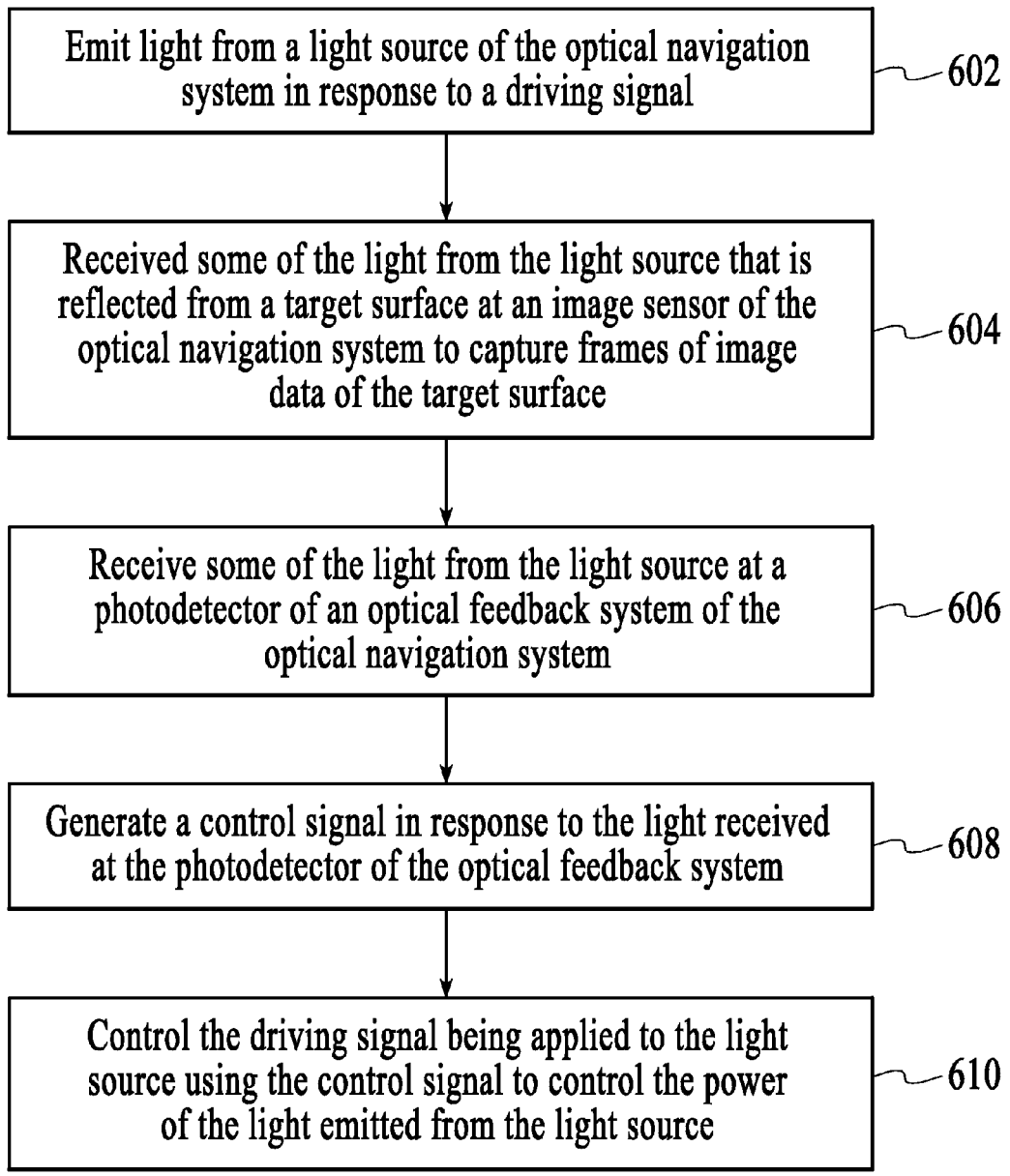
FIG. 6 is a process flow diagram of a method of controlling the light output power of an optical navigation system in accordance with an embodiment of the invention.

A method of controlling the light output power of an optical navigation system in accordance with an embodiment of the invention is described with reference to a process flow diagram of FIG. 6. At block 602, light is emitted from a light source of the optical navigation system in response to a driving signal. Next, at block 604, some of the light from the light source that is reflected from a target surface is received at an image sensor of the optical navigation system to capture frames of image data of the target surface. Next, at block 606, some of the light from the light source is received at a photodetector of an optical feedback system of the optical navigation system. Next, at block 608, a control signal is generated in response to the light received at the photodetector of the optical feedback system. Next, at block 610, the driving signal being applied to the light source is controlled using the control signal to control the power of the light emitted from the light source.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system comprising:
   a light source configured to emit light in response to a driving signal;
   an image sensor positioned to receive some of said light reflected from a target surface to capture frames of image data of said target surface;
   a current source connected to said light source to control said driving signal being applied to said light source; and
   an optical feedback system optically coupled to said light source to receive some of said light emitted from said light source, said optical feedback system being electrically connected to said current source to provide a control signal to said current source to control said driving signal being applied to said light source to control the power of said light emitted from said light source, wherein said optical feedback system comprises:
   a photodetector configured to produce electrical current in response to said light received at said photodetector;
   a current-to-voltage converter operably connected to said photodetector, said current-to-voltage converter being configured to convert said electrical current into an output voltage signal;
   an error amplifier operably connected to said current-to-voltage converter to compare said output voltage signal to a reference voltage signal to produce an error signal, said error signal being used as said control signal for said current source; and
   a reference circuit operably connected to at least said error amplifier to provide said reference voltage signal, said reference circuit being configured to produce a second reference voltage signal that is supplied to said current-to-voltage converter.

2. The system of claim 1 wherein said photodetector includes a photodiode.

3. The system of claim 2 wherein said light source is a vertical-cavity surface-emitting laser, said vertical-cavity surface-emitting laser and said photodiode being parts of a single semiconductor die.

4. The system of claim 1 wherein said reference circuit includes an operational amplifier and first and second resistors, said first and second resistors being connected in series between an output of said operational amplifier and electrical ground, said output of said operational amplifier being connected to said error amplifier to provide said reference voltage signal, a node between said first and second resistors being connected to said transimpedance amplifier to provide said second reference voltage signal.

5. The system of claim 1 further comprising a beam splitter positioned to receive said light emitted from said light source, said beam splitter being configured to reflect some of said light to said photodetector of said optical feedback system and to transmit some of said light to said target surface to be received by said image sensor.

6. The system of claim 1 further comprising a collimating lens positioned between said light source and said target surface.

7. The system of claim 6 further comprising an imaging lens positioned between said target surface and said image sensor.

8. The system of claim 1 wherein said light source includes a vertical-cavity surface-emitting laser.

9. A method of controlling the light output power of an optical navigation system, said method comprising:
   emitting light from a light source of said optical navigation system in response to a driving signal;
   receiving some of said light from said light source that is reflected from a target surface at an image sensor of said optical navigation system to capture frames of image data of said target surface;
   receiving some of said light from said light source at a photodetector of an optical feedback system of said optical navigation system;
   generating a control signal in response to said light received at said photodetector of said optical feedback system; and
   controlling said driving signal being applied to said light source using said control signal to control the power of said light emitted from said light source, wherein said generating said control signal includes:
   producing electrical current in response to said light received at said photodetector;
   converting said electrical current into an output voltage signal;
   comparing said output voltage signal to a reference voltage signal to produce an error signal, said error signal being used as said control signal for said light source;
   producing said reference voltage signal using a reference circuit, said reference voltage signal being used to produce said error signal using an error amplifier; and
   producing a second reference voltage signal using said reference circuit, said second reference voltage signal being used for said converting of said electrical current into said output voltage signal.

10. The method of claim 9 wherein said converting includes converting said electrical current into said output voltage signal using a transimpedance amplifier.

11. The method of claim 10 wherein said comparing includes comparing said output voltage signal to said reference voltage signal to produce said error signal using an error amplifier.

12. The method of claim 9 further comprising reflecting some of said light emitted from said light source to said photodetector.

13. The method of claim 9 further comprising collimating some of said light emitted from said light source.

14. The method of claim 9 further comprising focusing some of said light reflected from said target surface onto said image sensor.

15. The method of claim 9 wherein said emitting said light includes emitting said light from a vertical-cavity surface-emitting laser.

16. A method of controlling the light output power of an optical navigation system, said method comprising:
   emitting light from a light source of said optical navigation system in response to a driving signal;

receiving some of said light from said light source that is reflected from a target surface at an image sensor of said optical navigation system to capture frames of image data of said target surface;

receiving some of said light from said light source at a photodetector of an optical feedback system of said optical navigation system;

generating a control signal in response to said light received at said photodetector of said optical feedback system; and controlling said driving signal being applied to said light source using said control signal to control the power of said light emitted from said light source, wherein said generating said control signal includes:

producing electrical current in response to said light received at said photodetector;

converting said electrical current into an output voltage signal using a transimpedance amplifier;

comparing said output voltage signal to a reference voltage signal to produce an error signal using an error amplifier, said error signal being used as said control signal for said light source; and producing said reference voltage signal and a second reference voltage signal using a reference circuit that includes an operational amplifier and first and second resistors, said first and second resistors being connected in series between an output of said operational amplifier and electrical ground, said output of said operational amplifier being connected to said error amplifier to provide said reference voltage signal, a node between said first and second resistors being connected to said transimpedance amplifier to provide said second reference voltage signal.

17. The system of claim 1 wherein said current-to-voltage converter is a transimpedance amplifier.

18. The method of claim 9 wherein said producing said reference voltage signal and said producing said second reference voltage signal include producing said reference voltage signal and said second reference voltage signal using said reference circuit that includes an operational amplifier and first and second resistors, said first and second resistors being connected in series between an output of said operational amplifier and electrical ground, said output of said operational amplifier being connected to said error amplifier to provide said reference voltage signal, said second reference voltage signal being produced at a node between said first and second resistors.

* * * * *